United States Patent [19]

Ooi

[11] Patent Number: 5,043,878
[45] Date of Patent: Aug. 27, 1991

[54] SYSTEM WITH REAL-TIME CHECKING OF PRIVILEGE LEVELS AND THE SYSTEM'S STATE TO ALLOW ACCESS TO INTERNAL RESOURCES OF THE SYSTEM

[75] Inventor: Yasushi Ooi, Tokyo, Japan

[73] Assignee: NEC Corporation, Tokyo, Japan

[21] Appl. No.: 393,039

[22] Filed: Aug. 9, 1989

Related U.S. Application Data

[63] Continuation of Ser. No. 829,895, Feb. 18, 1986, abandoned.

[30] Foreign Application Priority Data

Feb. 18, 1985 [JP] Japan .................................. 60-29657

[51] Int. Cl.$^5$ ............................................. G06F 9/46
[52] U.S. Cl. ................... 364/200; 364/242.6; 364/242.8; 364/242.9; 364/242.91; 364/242.93; 364/246.1; 364/246.6; 364/246.9; 364/247.8; 364/259.2
[58] Field of Search .............................. 364/200, 900

[56] References Cited

U.S. PATENT DOCUMENTS

| | | | |
|---|---|---|---|
| 3,824,551 | 7/1974 | Arciprete et al. | 364/200 |
| 3,916,385 | 10/1975 | Parmar et al. | 364/200 |
| 4,253,145 | 2/1981 | Goldberg | 364/200 |
| 4,347,565 | 8/1982 | Kaneda et al. | 364/200 |
| 4,395,757 | 7/1983 | Bienvenu et al. | 364/200 |
| 4,400,769 | 8/1983 | Kaneda et al. | 364/200 |
| 4,442,484 | 4/1984 | Childs, Jr. et al. | 364/200 |
| 4,456,954 | 6/1984 | Bullions, III et al. | 364/200 |
| 4,459,661 | 7/1984 | Kaneda et al. | 364/200 |
| 4,524,415 | 6/1985 | Mills, Jr. et al. | 364/200 |
| 4,533,996 | 8/1985 | Hartung et al. | 364/200 |
| 4,547,849 | 10/1985 | Louie et al. | 364/200 |
| 4,787,031 | 11/1988 | Karger et al. | 364/200 |

OTHER PUBLICATIONS

Motorola Microprocessors Handbook, Series C, Austin, Texas, Motorola Inc, 1983, pp. (3-302 to (3-304) and (3-342) to (3-349).

*Primary Examiner*—Thomas C. Lee
*Assistant Examiner*—Robert B. Harrell
*Attorney, Agent, or Firm*—Sughrue, Mion, Zinn, Macpeak & Seas

[57] ABSTRACT

A data processing apparatus has a plurality of execution status and is adapted to control in accordance with the respective execution conditions the allowance of the execution of an instruction requiring the reference to the internal resource. The processing apparatus also comprises a register for holding the execution status, and another register for holding information controlling the reference to the internal resource. A comparator responds to the contents of the first and second registers to output a signal indicating whether the reference is allowed or not. The output signal and a strobe signal are fed to a gate, which then controls an actual reference to the internal resource.

13 Claims, 7 Drawing Sheets

SYSTEM WITH REAL-TIME CHECKING OF PRIVILEGE LEVELS AND THE SYSTEM'S STATE TO ALLOW ACCESS TO INTERNAL RESOURCES OF THE SYSTEM

This is a continuation of application Ser. No. 06/829,895, filed Feb. 18, 1986, which is now abandoned.

BACKGROUND OF THE INVENTION

1. Field of the Invention

The present invention relates to a data processing apparatus capable of controlling at least one instruction execution right, and more particularly to a data processing apparatus capable of independently controlling a reference right for accessing one or more internal resources at the time of executing a given instruction. More specifically, the present invention relates to a virtual computer system having programmable privilege levels.

2. Description of Related Art

Heretofore, the reference right to internal resources in the data processing apparatus has been controlled by sorting the operations of the instructions into "privileged operation" and "non-privileged operation". Specifically, the data processing apparatus has an execution status register for distinguishing whether or not the processor itself is in a privileged condition or in a non-privileged condition. In most cases, this execution status register is a register for holding at least one part of a program status word (PSW). In the privileged condition, it is allowed to execute all the instructions, and in the non-privileged condition, the execution of only the non-privileged instructions is allowed. In other words, the execution of the privileged instructions is inhibited in the non-privileged mode. With this arrangement, the operation of important internal resources are all treated as the privileged instructions, so as to prevent the leakage of the internal resources by the non-privileged instructions.

However, if a virtual computer system (virtual machine) is constructed by using the above mentioned conventional data processing apparatus, the performance will drop when the privileged instructions are executed. This virtual machine is intended to realize a plurality of operating systems on one computer system, and a few types of systems are actually used.

The virtual machine system comprises one real machine and one or more machines associated thereto. A software for performing one or more operating systems on the real machine is called "virtual machine monitor", which is hereinafter called "host OS". On the other hand, one or more operating systems managed by the virtual machine monitor are called "guest OS". In addition, one or more machine interfaces constructed by the real machine and the host OS are called "virtual machine", and the respective guest OSs run on corresponding virtual machines.

Specifically, the host OS serves to perform the control of the resource management scheduling and the execution sequences of the respective virtual machines on the real machine, and also to execute the dispatch treatment. In addition, the host OS serves to simulate the privileged instructions of the guest OSs. Ordinarily, only the host OS runs when the real machine is in the privileged condition. On the other hand, the guest OSs run only when the real machine is in the non-privileged condition, and therefore, they cannot directly execute the privileged instructions. However, since the guest OSs are prepared on the assumption that guest OS itself runs in the privileged condition, it is required that the privileged instructions of the guest OS run on the virtual machines as they are. Because of this, when the privileged instructions of the guest OS are detected, the privileged instructions of the guest OS are conventionally simulated in an exception processing routine of the host OS as the privileged instruction exception. In this method, every time the guest OS executes the privileged instructions, the exception processing routine of the host OS is necessarily triggered. Therefore, when the privileged instructions are executed by a guest OS, indirectly through the list, the performance will drop significantly in comparison to a direct execution of the privileged instructions.

In order to overcome the above problem, there has been proposed a so-called "privileged instruction assist" in which the privileged instructions of the guest OS is simulated by firmware and without generating the privileged instruction exception. However, this method cannot fundamentally solve the above mentioned problem. The reason for this is that as far as the privileged instructions of the guest OS is simulated or emulated by means of software or firmware, the overhead is inevitably large as compared with the case in which the privileged instructions themselves are directly executed. This problem is most noticeable when simple privileged instructions are executed.

SUMMARY OF THE INVENTION

Accordingly, it is one object of the present invention to provide a data processing apparatus which has overcome the aforementioned problems.

Another object of the present invention is to provide a data processing apparatus which can execute the privileged instructions of the guest OS without large overhead.

Still another object of the present invention is to provide a data processing apparatus which can selectively control a plurality of references contained in an instruction to be executed.

A further object of the present invention is to provide a virtual machine system in which the privilege level is programmable.

The above and other objects of the present invention are achieved by a data processing apparatus in accordance with the present invention which has a plurality of execution modes and which is adapted to control in accordance with the respective execution modes the allowance of the execution of an instruction requiring the reference to the internal resource or resources. The processing apparatus comprises first means for holding the information indicating an execution mode, second means for holding information controlling the reference to the internal resource or resources, third means in response to the contents of the first and second means to decide whether the reference is allowed or not, and fourth means responsive to the decision of the third means to decide whether the reference is executed or not.

For improvement of the performance in the virtual machine, it is important to provide a hardware architecture which can elevate the system's performance, particularly at the time of executing a privileged instruction by the guest OS. The above mentioned data processing apparatus, in accordance with the present invention, satisfies this requirement.

Specifically, the present invention introduces a "programmable privileged resources" in the hardware architecture. The conception of this programmable privileged resource can be considered as follows: Ordinarily, most of the privileged instructions use a particular "resource" in conjunction with the hardware system control, and therefore, they are treated as being privileged. Accordingly, the operation times themselves are not required to be privileged. Thus, when a HALT instruction, which needs no operand is considered, it is possible to define the HALT processing in association with any selected internal resource in the system and also to privilege the selected resource so that the operation itself is not considered to be privileged. In this manner, a part or all of the privileged instructions can be replaced by non-privileged instructions executable when the resources to be operated by the same privileged instructions are in the privileged instructions and when the system itself is also in the privileged condition. Here, the resources put in the privileged condition are called "privileged resource" (PR). Among the privileged resources, the resource changeable between the privileged condition and the non-privileged condition by instructions are called "programmable privileged resource" (PPR).

Therefore, the data processing apparatus of the present invention is effective, particularly when a virtual machine is realized for example on a ring protection structure. One typical method will be explained below.

Firstly, the execution privileged levels for the host OS, the guest OS and the application program are settled from the highest level to the lowest level in the mentioned order. Then, in the processing system, the highest privileged instructions allowed to only the host OS are determined, and ordinary privileged instructions allowed to the guest OS are determined, so as to establish the management procedure for the privileged condition of these instructions. For example, this procedure is such that when the host OS dispatches the guest OS No. 1, the reference resource by the ordinary privileged instructions for the guest OS No. 1 are programmed to their privilege level. When it is returned by the host OS call, all the reference resources for the ordinary privileged instructions are returned to the highest privilege. In this manner, while the important internal resources are protected from the execution of the application programs, a flexible management can be performed between the host OS and the guest OSs.

However, the present invention is different from the conventional capability base addressing. Namely, the concept of the privileged resource which makes the privileged instruction programmable, is different from the concept of using a capability factor which protects all the objects operated by the instructions, on the basis of a capability table. The former concept requires flexibility and the latter concept needs security. The most significant difference is that no procedure has yet been proposed to permit the concept of using a capability factor to include privileged instructions in the processor which can execute capability base addressing. Specifically, the object protected in the processor having the capability architecture is not the internal environment of the processor, but the external environment. Namely, the "objects" are allocated to the logical addresses generated by the processor itself, and the access right is defined. On the other hand, however, the internal environment of the processor is still treated as a core portion to be protected as a matter of course, so that the "privilege instructions" such as the capability operation instructions are discriminated to be truly privilege or not on the basis of the code inherent to the respective instructions, by means of an instruction decoding means which constitutes the internal environment of the processor. In this invention, on the other hand, the privilege is not discriminated on the basis of the instruction codes. Namely, the discrimination is performed at the time of accessing to the internal privileged resource of the processor, and the discrimination itself is programmable.

The above and other objects, features and advantages of the present invention will be apparent from the following description of preferred embodiments of the invention with reference to the accompanying drawings.

DESCRIPTION OF THE PREFERRED EMBODIMENTS

Figure 1:
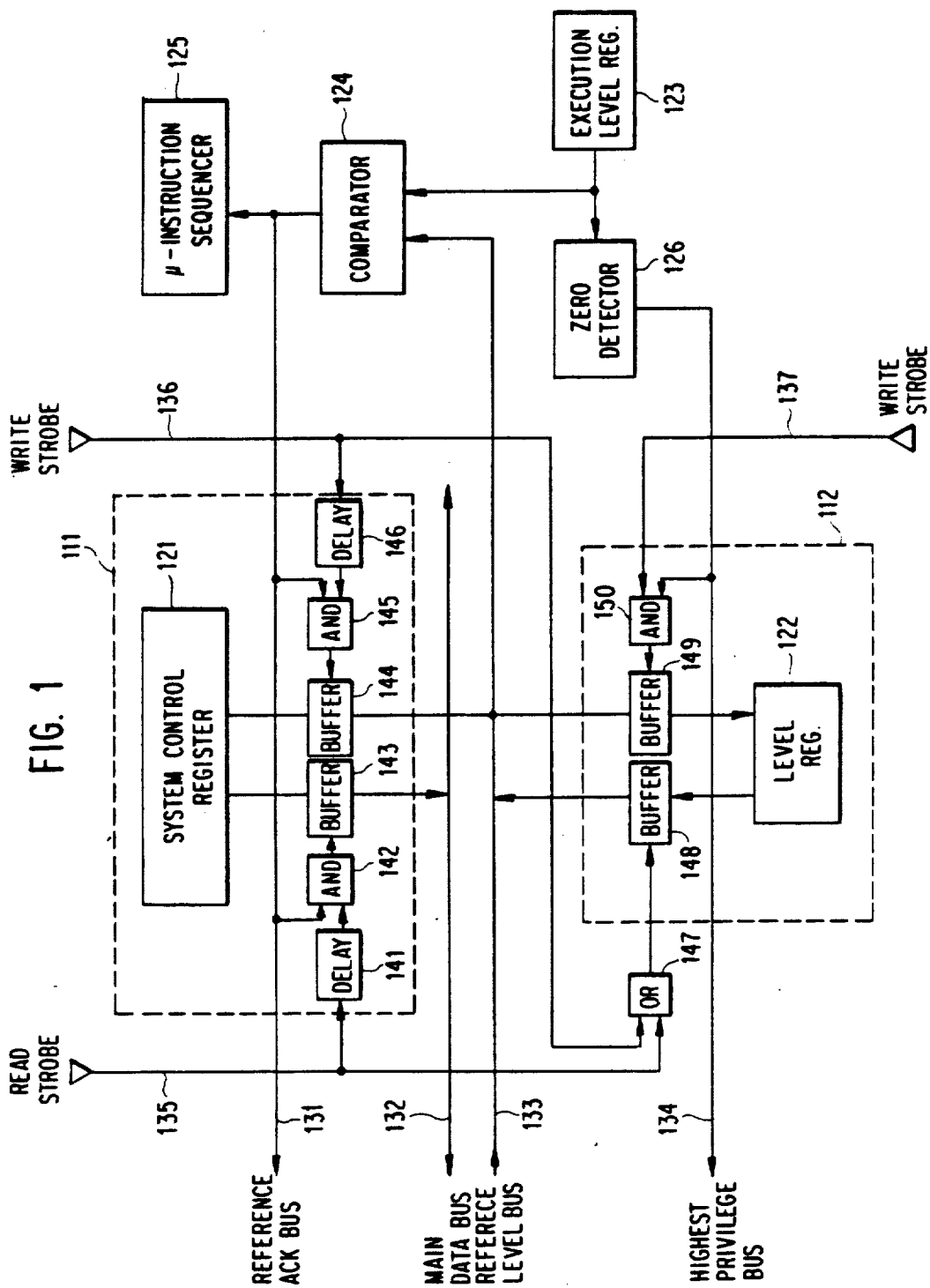
FIG. 1 is a block diagram showing one embodiment of the data processing apparatus in accordance with the present invention.

Referring to FIG. 1, there is shown the construction of a simplified system embodying the present invention. The illustrated system includes a system control register cell 111, which constitutes one privileged resource. This register cell 111 includes one system control register 121, and the access right to the register 121 is controlled by a system control level register 122 provided in a system control level register cell 112, which constitutes a reference control register. The system control register cell 111 and the system control level register cell 112 are associated with an execution level register 123, a comparator 124, a microinstruction sequencer 125 and a zero detector 126, which are coupled by a signal line or lines (bus) as shown in FIG. 1.

When a read/write access is requested to the register 121, the content of the level register 122 is compared with the content of the execution level register 123 by the comparator 124. On the basis of the result of the comparison, there is decided (1) whether the access to the register is acknowledged or inhibited, (2) whether or not the instruction is interrupted by the microinstruction sequencer 125.

Specifically, at the time of read-accessing to the system control register 121, the system control register READ signal 135 is rendered active, so that it is input to the system control register cell 111 and the system control level register cell 112. Namely, the active signal 135 is passed through an OR gate 147 to an output buffer 148, so that the buffer 148 is opened. As a result, the content of the level register 122 is fed to a reference level bus 133 and then further applied to one input of the comparator 124 whose other input receives the content of the execution level register. Thus, the comparator 124 supplies the result of the comparison through a reference acknowledge bus 131 to the system control register cell 111.

In this embodiment, the ring protection is intended. Therefore, the access execution right can be settled at various levels. It is assumed that the execution level of "0" indicates the strongest execution right or the highest privilege. Moreover, as the execution level becomes larger, the execution right becomes weaker.

In this condition, when the value of the register 123 is equal to or larger than that of the bus 133, the comparator 124 generates an active signal. To the contrary, when the value of the bus 133 is larger than that of the register 123, the comparator 124 generates an inactive signal. On the basis of the reference control signal thus generated, the register cell 111 determines whether or not the content of the register 121 is supplied to a main data bus 132.

The read signal 135 is delayed by a delay element 141, so that the delayed read signal and the reference control signal are applied to an AND gate 142 in synchronism to each other. Thus, a decision is finally made by the AND gate 142 on whether or not the read operation is performed, and an output buffer 143 is opened or closed in accordance with the final decision.

When the system control register 121 is accessed for write, the system control register WRITE signal 136 is rendered active, so that the active write signal 136 is applied through the OR gate 147 to the buffer 148. As a result, an operation similar to the operation performed during the READ access will be executed, and the resultant reference control signal on the bus 131 determines whether or not the WRITE access is acknowledged or inhibited. Namely, the reference control signal on the bus 131 and the WRITE signal 136 delayed by a delay element 146 are applied to an AND gate 145, whose output is connected to an input gate 144 coupled between the system control register 121 and the main data bus.

As seen from the above, the system control level register 122 is read out for reference control at the time of READ/WRITE access to the system control register 121. In addition, the writing to the level register 122 itself is subjected to the reference control by means of similar controller. Namely, the shown embodiment is necessarily designed such that the system control level register 122 is writable only in the highest privileged condition (level 0). Therefore, the zero detector 126 inspects whether or not the content of the execution level register 123 is zero, and outputs the result of the detection to a highest privilege indication bus 134. The signal on the bus 134 is supplied together with a write signal 137 to an AND gate 150, whose output is coupled to a register input gate 149. When this gate 149 is opened, the signal on the data bus 132 is written to the system control level register 122.

Figure 2:
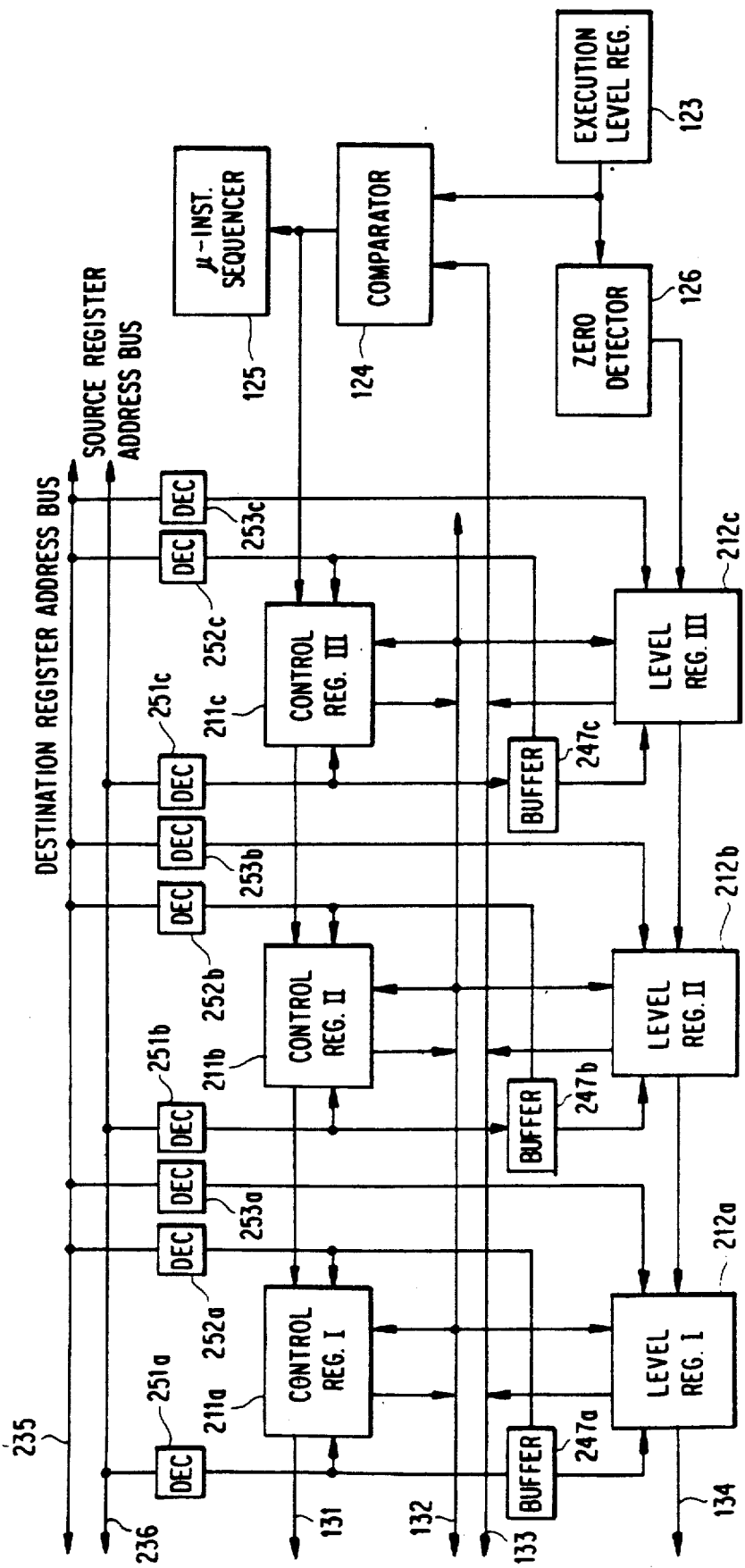
FIG. 2 is a block diagram showing a second embodiment of the data processing apparatus.

Turning to FIG. 2, there is shown another embodiment in which a plurality of system control register cells 211a, 211b and 211c are coupled with a plurality of system control level register cells 212a, 212b and 212c in one-to-one relation in the same manner as that shown in FIG. 1, and which execute the reference controls independently of each other. In FIG. 2, elements similar to those shown in FIG. 1 are given the same reference numerals.

When a system control register is read out, the register address is supplied on a source register address bus 236. The value on the address bus 236 is simultaneously decoded by decoders 251a, 251b and 251c, and a READ signal is generated to a register pair comprising one system control register cell and one system control level register cell, which are designated by the address on the bus 236. For the designated pair of the system control register cell and the system control level register cell, an operation similar to that executed in the FIG. 1 embodiment will be performed.

At the time of system control register writing, a register address is supplied on a destination register address bus 235, and then decoded by decoders 252a, 252b and 252c, so that a WRITE signal is produced to a designated pair of system control register cell and system control level register cell. An operation for this designated pair of register cells is performed, similarly to that in the FIG. 1 embodiment.

For writing the system control level register cell, a given register address is fed to the destination register address bus 235, and then decoded by decoders 253a, 253b and 253c. As a result, a WRITE signal is applied to a designated system control level register cell. Thereafter, an operation will be performed, similarly to that performed in the FIG. 1 embodiment when the system control level register cell is written.

Figure 3:
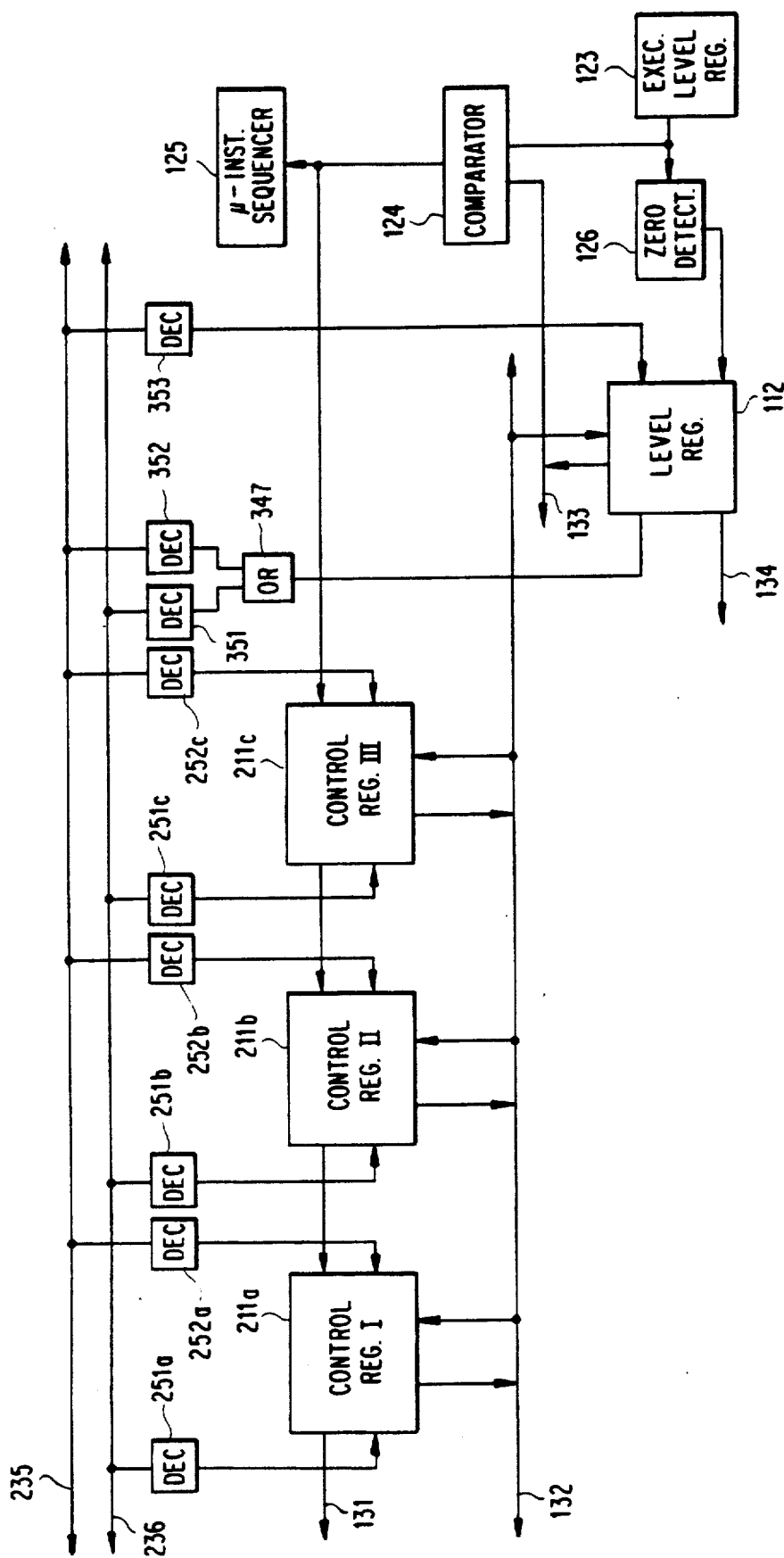
FIG. 3 is a block diagram showing a third embodiment of the data processing apparatus.

Referring to FIG. 3, the data processing apparatus includes a plurality of system control register cells 211a, 211b and 211c similarly to the FIG. 2 embodiment, but there is provided only one system control level register cell 112 common to all the system control register cells. In FIG. 3, elements similar to those shown in FIG. 1 or 2 are given the same reference numerals, and an explanation will be made on only portions different from the FIG. 2 embodiment. Namely, a decoder 351 is adapted to decode the OR condition between the decoders 251a, 251b and 251c, so that when the READ access is delivered to any one of the system control register cells 211a, 211b and 211c, the decoder 351 generates an active output. In addition, another decoder 352 serves to decode the OR condition between the decoders 252a, 252b and 252c, so that when the WRITE access is requested to any one of the system control register cells 211a, 211b and 211c, the output of the decoder 352 is rendered active. Therefore, an OR gate 347, which receive the outputs of both the decoders 351 and 352, supplies the system control level register cell 112 with an active output if a READ/WRITE access is generated to any one cell of the system control register cell 211a, 211b and 211c. As a result, the system control level register cell 112 is triggered, and a signal is fed back through the bus 133, the comparator and the bus 131 to a designated system control register cell, similarly to the FIG. 2 embodiment.

When the system control level register cell 112 is written, an address on the destination register address bus 235 is decoded by a decoder 353, and the resultant WRITE signal is supplied to the system control level register cell 112.

Figure 4:
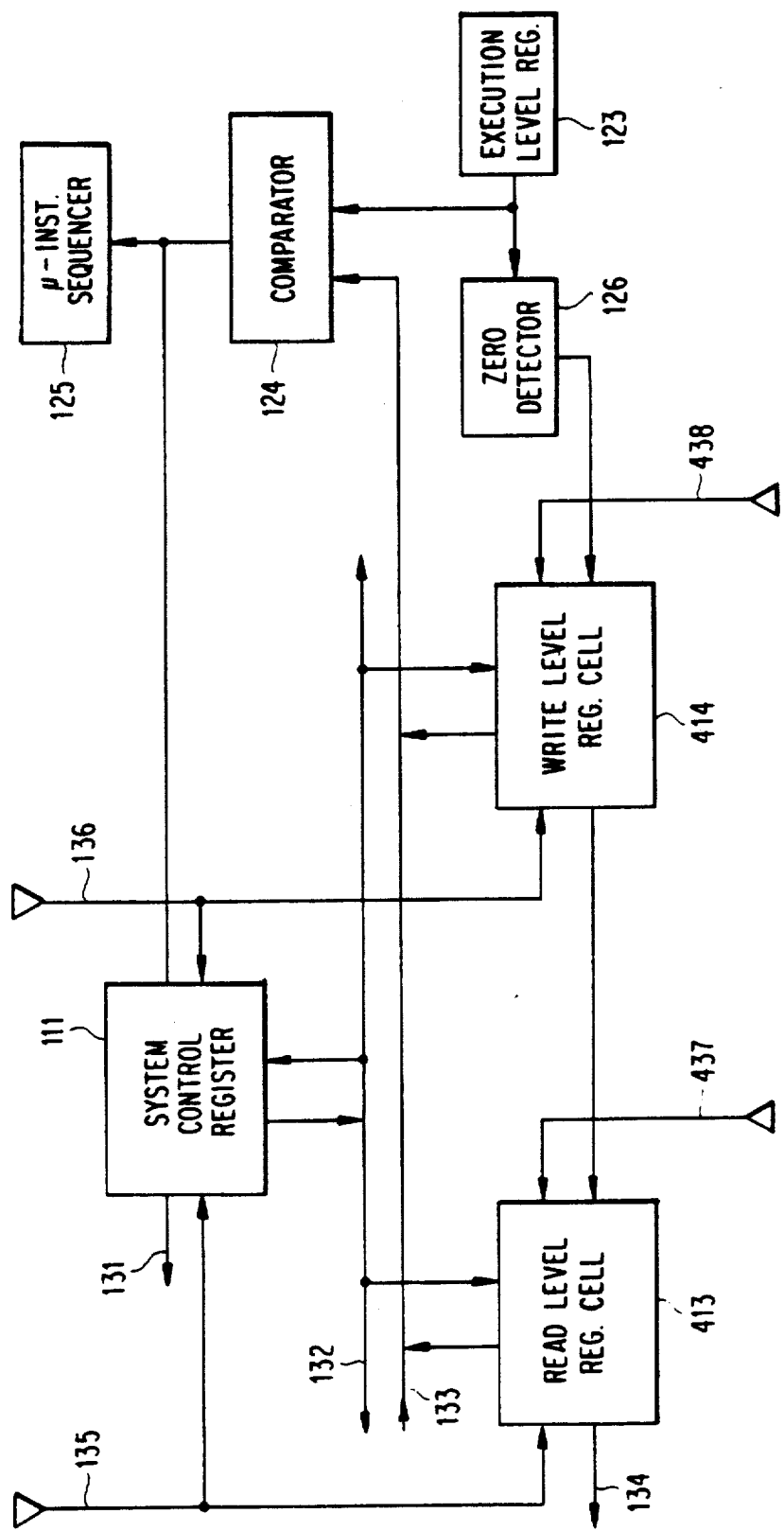
FIG. 4 is a block diagram showing a fourth embodiment of the data processing apparatus.

Turning to FIG. 4, there is a fourth embodiment in which a READ access level and a WRITE access level different to each other are settled to one system control register cell 111. In this embodiment, elements similar to those shown in FIG. 1 are given the same reference numerals, and explanation thereof will be omitted.

A READ level register cell 413 is provided for only the READ access to the system control register cell 111, and is triggered only when the READ signal 135 is rendered active. On the other hand, a WRITE level register cell 414 is provided for only the WRITE access to the cell 111, and is triggered only when the WRITE signal 136 is rendered active. The outputs of both the READ level register cell 413 and the WRITE level register cell 414 are coupled to the reference level bus 133. The writing to these register cells 413 and 414 are performed through WRITE strobes 437 and 438, respectively.

The above mentioned data processing apparatus can be applied to the virtual machine. In such case, the host OS, the guest OS and the application programs are allotted to the highest privilege level (level 0), the intermediate privilege level and the non-privilege level (the lowest privilege level), respectively. In addition, while the instruction codes corresponding to the respective privilege levels are being executed, the execution level is set in an execution status register (program status word register) such as the execution level register 123. For example, when a reference control register such as the system control level register cell 112 is required, as when the host OS dispatches the guest OS, the execution level for the host OS is set in the execution status register. In the other cases, the execution level for the guest OS is set in the execution status register. Thus, in the case of an operation required for the guest OS to execute the privileged instruction of the guest OS itself, the host OS is called by the system call, and then the related internal resource such as the system control register 111 is accessed. In the other situations, the internal resources can be directly accessed by the guest OS. This direct access will greatly improve the performance when the privileged instructions are executed.

In addition, the programmable privileged resources can be applied not only to the system control related resources in the processor, but also to application execution environments such as general purpose registers. In this case, it is possible to make the general purpose register in the virtual machine as the privileged register, so that there is inhibited an illegal register reference between the host OS and the guest OS or between the guest OSs. In addition, it is also possible to cause the interrupt at the time of the illegal reference.

As stated above, what is defined by the programmable privileged resources is the access right to the respective privileged resources. However, considering a collection of the privileged resources, all the resources not greater than a given execution level can be deemed to define as a whole one program processing environment executed at the given level.

Therefore, in the case of instructions requiring access individually to the respective privileged resources (or unit groups which can be regarded to be functionally distinguishable from each other), the execution rights themselves of these instructions are defined by the programmable privileged resources. On the other hand, in the case of a reference/change instruction in relation to the entire privileged resources, the programmable privileged resource can be considered to define the execution extent of the instruction, i.e., the extent of the resources allowed for the reference/change. For example, a transfer instruction of all the privileged resources in conjunction with the task change-over, such as a content switch instruction is executable at any given execution level, and can be realized in such a manner as to refer or change only the privileged resources programmed not greater than the given execution level.

Figure 5:
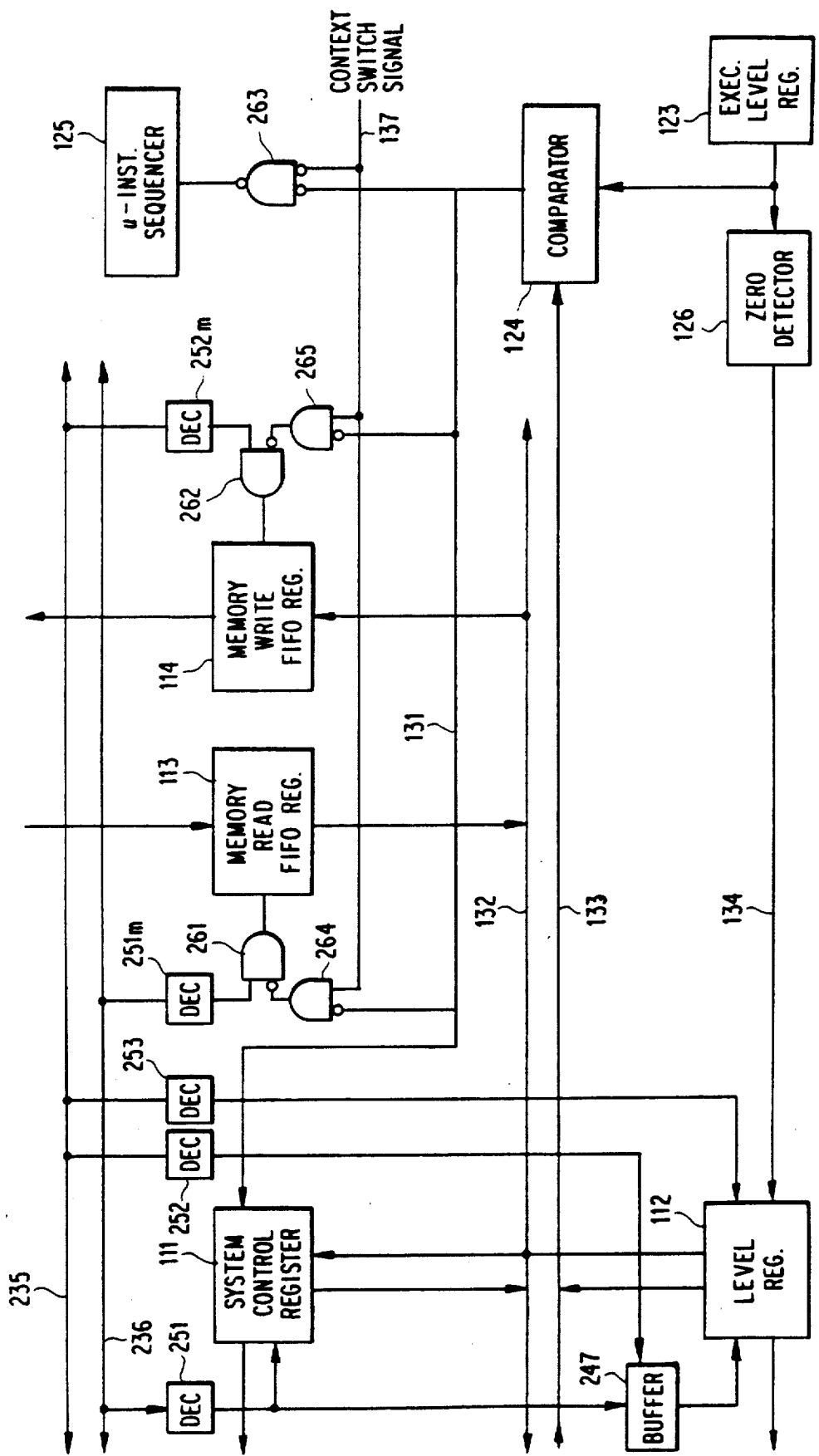
FIG. 5 is a block diagram showing a fifth embodiment of the data processing apparatus.

For this purpose, the embodiment of FIG. 1 can be modified as shown in FIG. 5. Namely, there are provided a memory read FIFO (first-in first-out) register 113 and a memory write FIFO register 114 which are adapted to receive a context switch instruction processing indication signal 137 through NOT-AND gates 261, 264 and 262, 265, respectively. The context switch instruction processing indication signal 137 is also applied through an OR gate 263 to the microinstruction sequencer 125. In addition, the gate 261 is opened and closed through a decoder 251m by the address data on the bus 236, and the gate 262 is controlled by a decoder 252m receiving the address data on the bus 235. The other elements are similar to the corresponding elements shown in FIG. 1 or 2, and therefore, are given the same reference numerals.

When the context switch instruction is executed, the signal 137 is rendered active. This signal will serve to inhibit transmission of the instruction interrupt signal 131 from the comparator 124 to the microinstruction sequencer 125. Further, the signal 137 is applied together with the reference control signal 131 through the gates 264 and 255 to the gates 251 and 252, with the result that the read signal from the decoder 251m to the memory read FIFO register 113 and the write signal from the decoder 252m to the memory write FIFO register 114 are inhibited.

Specifically, when the context switch instruction is executed, the operation is as follows: the register addresses of the privileged resources constituting the context are sequentially generated by using for example the microcodes. These addresses are supplied to the destination register address bus 235 in the case of load context instruction, and to the source register address bus 236 in the case of store context instruction. In addition, in the case of load context instruction, the address for the memory read FIFO register 113 is transmitted to the source register address bus 236, and in the case of store context instruction, the address for the memory write FIFO register 114 is fed to the destination register address bus 235.

In this condition, the access right is checked by the comparator one by one on access to the respective privileged resources. As a result, if the reference acknowledge signal is generated, the access is allowed, and the transfer is executed through the main data bus 132. However, when the reference acknowledge signal is not generated, the interrupt signal is generated to the microinstruction sequencer 125 in the first embodiment shown in FIG. 1, but the interrupt signal from the comparator 124 is blocked at the gate 263 by the context switch instruction execution indication signal 137, in the FIG. 5 embodiment. In addition, the signal condition on the bus 131 will inhibit the read signal to the register 113 and the write signal to the register 114. Therefore, the two FIFO registers 113 and 114 do not operate. Thus, the transfer is not performed, but it is kept in ready condition for the next transfer execution.

As seen from the above, in the embodiment shown in FIG. 5, the signal on the reference acknowledge bus 131 is used as a read/write inhibit signal on particular destination/source resources such as I/O buffers in the date transfer through the main data bus. At this time, the condition of the microinstruction sequencer 125 is kept without change. Thus, the block transfer of the privileged resources is executed through the FIFO register buffers. An external object accessed through the FIFO buffers is for example, a particular memory region such as task control block in the main memory which stores the context of the system environment defined by the privileged resources.

Next, explanation will be made to examples of the programmable privileged resources and methods of realizing the programmable privileged resources on an extended central processing unit (CPU) architecture. In this method, all the privileged instructions are treated as executable instructions similar to ordinary instructions when they are decoded. However, when these privileged instructions are actually executed, the instructions are perfectly or partially executed in the privilege level of the resource referred to, or the instructions are not executed and a decision is made on whether the privileged instruction exception is generated or the trap is performed.

(1) Write/Read to the Privileged Resource

The transfer instruction to/from the privileged register is one of the simplest examples. In this case, the present execution level (the privilege level of the present status) is compared with the privilege level programmed to the privileged register (the programmed privilege level), and if the access is acknowledged, the instruction is executable. If the access is not allowed, the privileged instruction exception is generated.

(2) Replacement of the Task Context (Load/Store)

The procedure cell/return instruction is an instruction for replacement of the context in the program (subroutine). On the other hand, the task context switch instruction is an instruction for replacement of the context on the CPU, in relation to the task produced by the OS or the virtual machine constructed by the virtual machine monitor.

At the time of switching the task context of the OS, the register in association the task control is the object of the replacement. When the virtual machine is switched over, the object of the replacement is the register in relation to the virtual machine control (the register holds different control data for different virtual machines).

In this case, the execution level is compared with the programmed privileged level of each register, and the context switch is selectively performed in accordance with the result of the comparison.

(3) Clear of the Address Conversion Buffer (1/All Entry)

In the case that OS managing the virtual memory based on paging is executed as the guest OS, particularly when the multi-virtual space is realized so that the virtual space is switched each time of the task switchings, the address conversion table corresponding to the task is converted at the time of the task switching. The guest OS is required to clear the address conversion buffer entry corresponding to the old task virtual space at the time of switching. At this time, each guest OS can be given the right of executing these instructions, under the management of the virtual machine monitor. Therefore, there is required a status register indicating the authority.

(4) Instructions for Controlling Virtual Memory Table

These instructions are used to control the virtual memory table. Whether or not these instructions are executed by the guest OS is decided upon whether or not the guest OS controls the virtual memories.

It is important whether or not the control of the address conversion table executed by the guest OS tends to destroy the instruction/data region relating to the virtual machine monitor. Basically, an address conversion from the virtual main memory to the real main memory is executed outside the CPU chip in view of the actual execution level in order to protect the instruction/data region relating to the virtual machine monitor. Such a protecting measure will be explained hereinafter in more detail.

(5) Command Instructions to the I/O Devices

These instructions are used to execute the input and output operation of the I/O port of the external peripheral.

In a program in which a plurality of application programs run simultaneously, access to the I/O port must be conducted successively in order to prevent these programs from interfering with each other. Accordingly, access to the I/O port is always controlled by the OS and then the application programs are not allowed to directly shut up the I/O instructions.

In case a virtual machine uses I/O devices which do not use any other virtual machine, however, the virtual machine is privileged to directly generate I/O instruction without generating a specific system call to the virtual machine monitor. The above goes the same for specific applications too. In a specific case, an external conversion tool is employed to accommodate the address conversion for the I/O space so as to access the I/O space so as to access the I/O space for the guest OS.

(6) Return from Interrupt/Exception Processing

This instruction is used to return from the interrupt/exception processing. This return instruction is different from the ordinary return instruction in that it is accompanied with the return (that is, the update) of the status register such as PSW which relates to the system control.

The status resource which is updated by this return instruction includes usually bits defining the system using CPU. The destruction of these bits may result in a software crash of the whole system. To the contrary, if this return instruction cannot be executed at level 1 or 2 to update the status resource relating to the OS, a virtual computer may not be realized.

It is possible to designate this control operation using a notion of the programmable privileged resource (PPR). In this case, the programmable privileged resource is defined to correspond to each bit of the status resource (PSW).

(7) Update PSW

This is an instruction to update the PSW. It operates similarly to the return instruction from the interrupt/exception.

(8) HALT, Clear CACHE, Diagnose

Commands determining the status of the hardware system must not be designated by the guest OS but by the virtual machine monitor. That is, these instructions must be executed by the virtual machine monitor in any case. However, for example, when the guest OS is intended to execute the HALT instruction, the "quasi" HALT processing for the virtual machine will be executed by dipatching the executable (the first priority) virtual machine by means of the privileged instruction exception processing.

In order to realize the memory management organization necessary to provide a virtual computer system, the address conversion from the virtual main memory to the real main memory is required to be executed externally of the CPU chip. For the purpose, a hardware is required externally of the CPU so as to support the virtual computer. In this connection, the key points are as follows:

(a) hardware for external address conversion (a-1) this can be executed by a dynamic address conversion using the memory managing chip (a-2) this can be also executed by a static address conversion in which the designation for each OS in performed by means of wired logics in the memory banks (b) notification to the virtual machine monitor when the address conversion has failed.

First, examination will be made on the external address conversion. The information necessary for the external address conversion is: (1) the access address; (2) the access status; (3) the present execution level; and (4) the present virtual machine identification number. These data can be furnished to an external of the CPU through the terminal output of CPU or through the external status register (which is set by means of a software by the virtual machine monitor. However, since the execution level is changed by the interrupt or others which cannot be known in the software, the above data must be supplied through the terminal output of the CPU.

In the address conversion using the memory management chip, the above four information group are combined as the virtual main memory address, which is then imputed to the memory management unit and is converted into a real main memory address.

In the memory bank system, the virtual main memory address obtained in the above method is regarded as the real main memory address without any change.

The conversion failure means that in the memory management unit does not prepare a corresponding address pair for conversion from the virtual main memory to the real main memory. The conversion incorrectness means that a real main memory corresponding to the virtual main memory does not truly exist or cannot be allowed to access even if it actually exists.

The address conversion by the virtual machine monitor can be executed either by paging or by segmentation. In any case, the instruction of conversion can be performed by interrupt to the instruction/operand access demand.

When the abnormality in the address conversion is informed by a bus error terminal of the CPU, there is triggered the bus error exception routine (which is started from the address defined by the interrupt/exception processing vector). In the routine, the cause of the trigger is analyzed, and if it is the external conversion failure, the mapping table for the virtual machine monitor is searched so as to prepare the necessary address conversion pair and to load it to the memory management unit. If the cause is judged to be the conversion incorrectness, the virtual machine is aborted by the virtual machine monitor.

The above manner is applied to the dynamic address conversion using the memory management unit. On the other hand, when the designation of regions for the respective OSs is statically converted, it is sufficient if only the conversion incorrectness is detected. For example, if the guest OS is about to break the processing regions inherent to the virtual machine monitor, the bus error exception is generated and the virtual machine is aborted.

Figure 6:
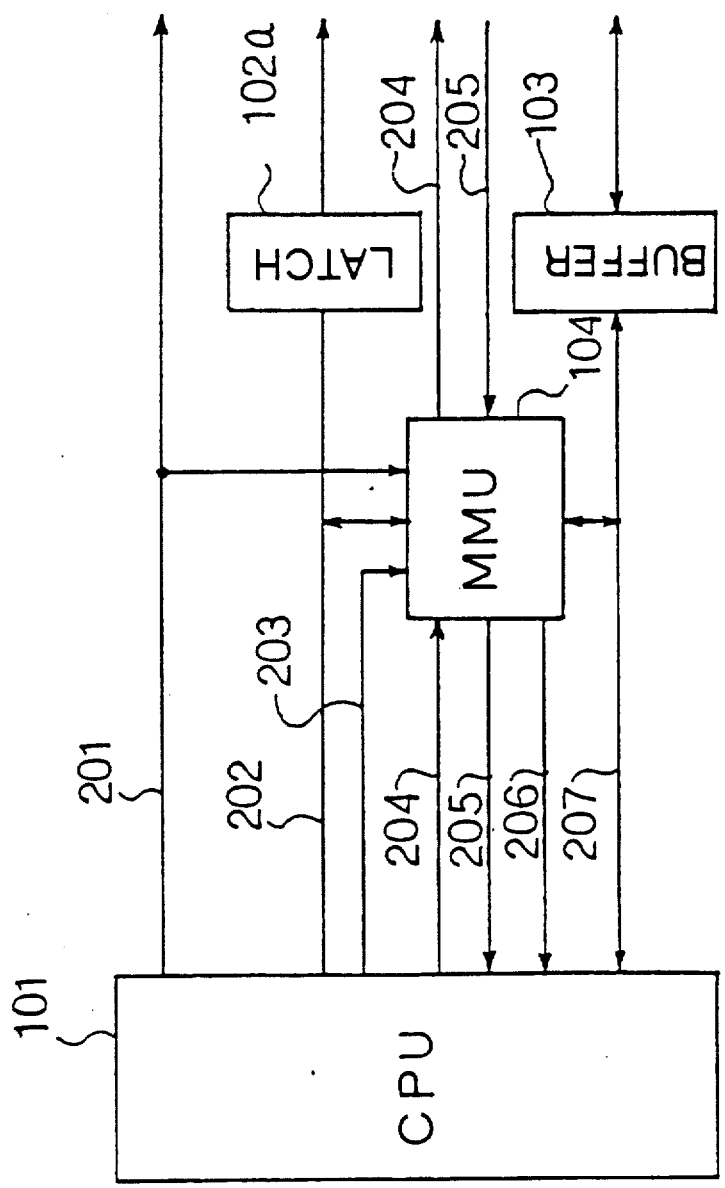
FIG. 6 is a block diagram showing one embodiment of a vertical computer system embodying the present invention.

FIG. 6 shows one example of the virtual computer system based on the above mentioned manner. The system comprises a CPU 101 associated with an address latch 102a, a data buffer 103 and a memory management unit 104, so that the dynamic address conversion is performed by means of the memory management unit.

In this system, an address 202, an execution level 203 and a status 201 for the virtual main memory are supplied to the memory management unit 104 where these data are converted and then returned to the address bus 202 so that the converted address is latched by the latch 102a. If the conversion results in incorrectness, an incorrect memory access notice signal 206 rendered active. If not so, a memory access start signal 204 is generated, and the memory access is performed through a data bus and the buffer 103. When the access is terminated, a memory access termination notice signal 205 is outputted to the CPU 101. If the conversion results in failure, the memory management unit 104 steps the CPU memory cycle and allows the access of a new conversion address pair to the internal memory of the unit 104. Incidentally, at the time of the virtual machine switching, all the conversion address pairs stored in the unit 104 are cleared by the host OS.

Figure 7:
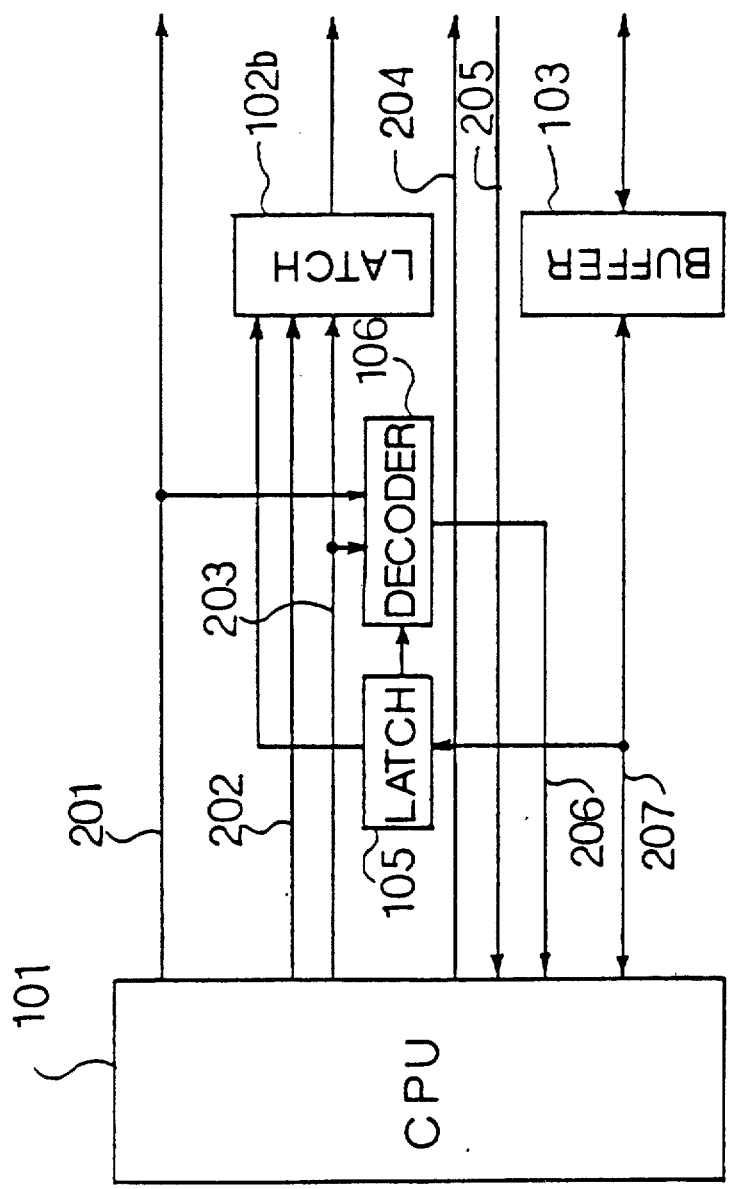
FIG. 7 is a block diagram showing a second embodiment of the vertical computer system embodying the present invention.

Turning to FIG. 7, there is shown another example of the virtual computer system in which the designation of regions for each os is performed by the wired OR logic in the memory bank. In this figure, elements and lines similar to those shown in FIG. 6 are given the same reference numerals. The system of FIG. 7 comprises an address latch 102b, a virtual computer identification number latch 105 and a decoder 106 in place of the address latch 102a and the memory management unit 104 shown in FIG. 6. In the FIG. 7 system, the address 102 corresponding to the virtual main memory, and the execution level 203 are supplied together with the virtual computer identification number of the latch 105 to the latch 102b, where a collection of data is latched as the real main memory address. Therefore, no conversion failure occurs. The content of the latch 105 is updated by the host OS at the time of the virtual machine switching. In addition, the incorrectness of the address conversion is statically detected by the decoder and notified through the incorrect memory access the incorrect memory access notice line 206 to the CPU 101.

As will be apparent from the above explanation with reference to the accompanying drawings, since the access right to the internal resources in the data processing apparatus is made programmable in the present invention, the performance and the flexibility of the virtual machine and the operating system will be greatly improved.

The invention has thus been shown and described with reference to specific embodiments. However, it should be noted that the invention is in no way limited to the details of the illustrated structures but changes and modifications may be made within the scope of the appended claims.

I claim:

1. A data processing apparatus, having a data bus and an address bus, which assumes at least one status and can execute instructions, the apparatus having a plurality of execution modes in which instructions are executed, the plurality of execution modes having different execution levels each indicative of a different status of the data processing apparatus, the apparatus having one or more internal resources each of which is assigned a privilege level, the apparatus referencing to the one or more internal resources when the apparatus performs an execution of instructions, the apparatus controlling the execution of an instruction requiring one reference to at least one given internal resource of the one or more internal resources in accordance with the plurality of execution modes, comprising:
   a first register for holding one level of the different execution levels indicative of the status of the data processing apparatus,
   a second register provided for said given internal resource for holding a privilege level assigned to said given internal resource,
   a comparator coupled to said first and second registers for comparing the levels held by said first and second registers so as to generate an output, comprising a reference acknowledge signal, when the level by said first register is not less than that of said second register,
   a third register means, comprising said one or more internal resources, connected to receive said output of said comparator so that reading and writing of said third register means via said data bus is controlled on the basis of said output of said comparator; and
   a controller coupled to receive said reference acknowledge signal for deciding whether or not the execution of said instruction requiring the reference to said given internal resource is executed.

2. A data processing apparatus as claimed in claim 1 wherein the given internal resource is coupled through a buffer to said data bus, the buffer being controlled by a logical gate receiving a strobe signal and an output of the comparator.

3. A data processing apparatus as claimed in claim 1 wherein the second register has an output connected through a buffer to the comparator, the buffer being controlled by a logical gate applied with a read strobe and a write strobe.

4. A data processing apparatus as claimed in claim 1 wherein said apparatus can assume a plurality of privileged conditions at different privilege levels, said first register includes a detector for detecting a highest privilege level, and wherein said second register has an input connected through an input gate to said data bus, the input gate being opened or closed by a logical gate receiving the output of said detector and a write strobe, so that the second register can be written when the data processing apparatus is in a highest privileged condition.

5. A data processing apparatus as claimed in claim 1 wherein the given internal resource has an input connected through an input gate to said data bus and an output connected through an output buffer to the data bus, the input gate being controlled by a logical gate receiving an output of the comparator and a write strobe, and the output buffer being controlled by another logical gate receiving the output of the comparator and a read strobe.

6. A data processing apparatus as claimed in claim 1 further including a plurality of internal resources and a plurality of second registers provided to the internal resources in a one-to-one relation, the comparator being common to all the second registers so as to receive at its one input all information held by the second registers and at its other input the information held by the first register, and an output of the comparator being commonly connected to all the internal resources.

7. A data processing apparatus as claimed in claim 1 further including a plurality of internal resources, the second register and the comparator being common to all the plurality of internal resources.

8. A data processing apparatus as claimed in claim 1 wherein the second register includes a read level register, responsive to a read level, and a write level register, responsive to write level, each register being operative independently of the other so that a read level and a write level can be set at different levels.

9. A data processing apparatus as claimed in claim 1 further including a memory read register and a memory write register which are coupled to said data bus, each of these registers having a control input connected to an output of a logical gate whose one input is connected through a decoder to an address bus and whose other input is controlled by an output of the comparator and a context switch instruction processing indication signal.

10. A data processing apparatus as claimed in claim 1 wherein said comparator has means for selectively allowing one of a plurality of references when a plurality of reference requests occur.

11. A data processing apparatus, having a data bus and an address bus, which assumes at least one status and can execute instructions, the apparatus having a plurality of execution modes in which instructions are executed, the plurality of execution modes having different execution levels each indicative of a different status of the data processing apparatus, the apparatus having one or more internal resources each of which is assigned a privilege level, the apparatus referencing to the one or more internal resources when the apparatus performs an execution of instructions, the apparatus controlling the execution of an instruction requiring one reference to at least one given internal resource of the one or more internal resources in accordance with the plurality of execution modes, comprising:
   a first register for holding one level of the different execution levels indicative of the status of the data processing apparatus,
   a second register provided for said given internal resource for holding a privilege level assigned to said given internal resource,
   a comparator coupled to said first and second registers for comparing the levels held by said first and second registers so as to generate an output, comprising a reference acknowledge signal, when the level by said first register is not less than that of said second register,
   a controller coupled to receive said reference acknowledge signal for deciding whether or not the execution of said instruction requiring the reference to said given internal resource is executed;
   a memory read register and a memory write register which are coupled to said data bus, each of said registers having a control input connected to an output of a logical gate whose one input is connected through a decoder to said address bus and whose other input is controlled by an output of said comparator and a context switch instruction processing indication signal; and wherein the control input of said memory read register is connected to an output of a logical gate having one input connected through a decoder to a source register address bus the other input of the logical gate being connected to an output of another logical gate whose one input is connected to an output of the comparator and whose other input is connected to receive the context switch instruction processing indication signal.

12. A data processing apparatus, having a data bus and an address bus, which assumes at least one status and can execute instructions, the apparatus having a plurality of execution modes in which instructions are executed, the plurality of execution modes having different execution levels each indicative of a different status of the data processing apparatus, the apparatus having one or more internal resources each of which is assigned a privilege level, the apparatus referencing to the one or more internal resources when the apparatus performs an execution of instructions, the apparatus controlling the execution of an instruction requiring one reference to at least one given internal resource of the one or more internal resources in accordance with the plurality of execution modes, comprising:

a first register for holding one level of the different execution levels indicative of the status of the data processing apparatus, a second register provided for said given internal resource for holding a privilege level assigned to said given internal resource, a comparator coupled to said first and second registers for comparing the levels held by said first and second registers so as to generate an output, comprising a reference acknowledge signal, when the level by said first register is not less than that of said second register, a controller coupled to receive said reference acknowledge signal for deciding whether or not the execution of said instruction requiring the reference to said given internal resource is executed;

a memory read register and a memory write register which are coupled to said data bus, each of said registers having a control input connected to an output of a logical gate whose one input is connected through a decoder to said address bus and whose other input is controlled by an output of said comparator and a context switch instruction processing indication signal; and wherein a control input of the memory write register is connected to an output of a logical gate having an input connected through a decoder to a destination register address bus the other input of the logical gate being connected to an output of another logical gate whose one input is connected to the output of the comparator and whose other input is connected to receive the context switch instruction processing indication signal.

13. A data processing apparatus, having a data bus and an address bus, which assumes at least one status and can execute instructions, the apparatus having a plurality of execution modes in which instructions are executed, the plurality of execution modes having different execution levels each indicative of a different status of the data processing apparatus, the apparatus having one or more internal resources each of which is assigned a privilege level, the data processing apparatus referencing to the one or more internal resources when the data processing apparatus performs an execution of instructions, the data processing apparatus controlling the execution of an instruction requiring one reference to at least one given internal resource of one or more internal resources in accordance with the plurality of execution modes, the data processing apparatus generating a signal requesting an access to said one given internal resource of said one or more internal resources as a result of the execution of an instruction, comprising:

a first register for holding one level of the different execution levels indicative of the status of the data processing apparatus, said first register outputting the execution level held therein in response to said access request signal, a second register provided for said given internal resource for holding a privilege level assigned to said given internal resource, a comparator coupled to said first and second registers for comparing the execution level outputted from said first register with the privilege level held in said second register so as to generate an output comprising a reference acknowledge signal, when the level held by said first register is not less than that of said second register, a third register means, comprising said one or more internal resource, connected to receive said output of said comparator so that reading and writing of said third register means via said data bus is controlled on the basis of said output of said comparator;

a controller coupled to receive said reference acknowledge signal for deciding whether or not the execution of said instruction requiring the reference to said given internal resource is executed, and a gate means receiving said access request signal and controlled by the output of said comparator so as to transmit or inhibit said access request signal to said one or more internal resources in accordance with a result of comparison made by said comparator so that when said access request signal is transmitted through said gate means to said one given internal resource of said one or more internal resource, a read/write to said one given internal resource of said one or more internal resources is allowed.

* * * * *

UNITED STATES PATENT AND TRADEMARK OFFICE
CERTIFICATE OF CORRECTION

PATENT NO. : 5,043,878
DATED : 8/27/91
INVENTOR(S) : Ooi

It is certified that error appears in the above-indentified patent and that said Letters Patent is hereby corrected as shown below:

Column 11, line 5, delete "dipatching", insert --dispatching--;

Column 12, line 38, delete "os", insert --OS--.

Signed and Sealed this

Third Day of August, 1993

Attest:

MICHAEL K. KIRK

*Attesting Officer*     Acting Commissioner of Patents and Trademarks